May 12, 1953     S. RUBEN     2,638,489
PRIMARY CELL
Filed March 7, 1951
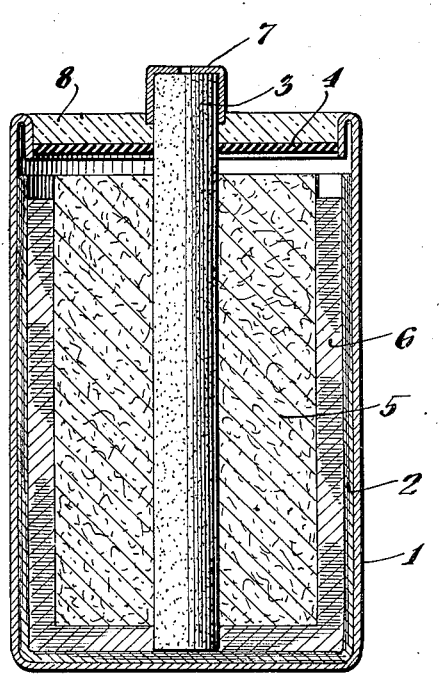
INVENTOR
*Samuel Ruben*
BY
ATTORNEY Patented May 12, 1953

2,638,489

UNITED STATES PATENT OFFICE 2,638,489

PRIMARY CELL

Samuel Ruben, New Rochelle, N. Y.

Application March 7, 1951, Serial No. 214,327

4 Claims. (Cl. 136—83)

This invention relates to primary cells.

The general object of the invention is the provision of a dry cell to replace the conventional zinc-carbon-sal ammoniac cells, which does not require the use of zinc, mercury or unduly corrosive electrolytes, and which will be competitive in cost with commercial Le Clanche cells.

Another object is the provision of an efficient primary cell utilizing aluminum as the anode.

A further object is the provision of an aluminum anode primary cell which can be stored for long periods of time without deterioration and which provides long and continuous operation.

Another object is the provision of an aluminum anode primary cell capable of supplying current over sustained periods without excessive polarizing effects.

A specific object of the invention is the provision of a novel electrolyte for primary cells employing aluminum anodes, and which will allow electrolytic reduction of a depolarizer compound, such as manganese dioxide.

Other objects will be apparent from the disclosure and from the drawing which is a view partly in section illustrating a cell structure embodying the invention.

Because of its high electrochemical equivalence and other desirable characteristics, including abundant availability, many attempts have been made to utilize aluminum in place of zinc; one gram of aluminum will deliver 2.98 ampere hours compared with 0.819 ampere hour available from one gram of zinc; but to date, no commercial dry cells employing aluminum anodes have been produced, although the supply of zinc has been steadily diminishing, while the supply of aluminum has been steadily increasing.

I have found a combination of cell elements which provides a cell of very desirable properties. My invention, broadly, comprises an electric current producing cell employing an anode of aluminum, an electrolyte of manganous chloride ($MnCl_2.4H_2O$) and a suitable depolarizer, preferably manganese dioxide.

The cell possesses a number of outstanding characteristics, for instance:

The relation of the electrolyte to the anode is such that there is no substantial interaction under storage conditions and negligible tendency for the aluminum to displace one of the electrolyte ions.

No insoluble blocking layer or film is formed on the aluminum during cell operation or discharge and therefore there is no tendency for the cell to prematurely polarize.

The cell will operate between wide temperature limits without excessive change in internal resistance or increased local action.

The potential of the cell employing a manganese dioxide depolarizer is 1.56 volts, close to that of the Le Clanche cell, so that it is readily substitutable. The elements are such that structures, practically identical with currently used dry cells, can be employed, as well as new structures, which take advantage of the relatively non-corrosive electrolyte and low gas producing characteristics of the cell.

The preferred electrolyte concentration is a 40% aqueous solution. The temperature stability of the electrolyte is indicated by the fact that at $-5°$ C., the concentration for a saturated solution is 37.8% and at 100° C., it is 53.7%. The electrolyte, by hydrolysis, is acidic, having a pH of about 4.

The preferred depolarizer is manganese dioxide, the electrolytic or synthetic ores being preferred because of their high density. Graphite or acetylene black is used to provide conductivity. In preparing the depolarizer, 900 grams of manganese dioxide is thoroughly mixed with 100 grams of acetylene black, to which is added 350 ml. of a 40% solution of $MnCl_2.4H_2O$, to provide a mixture suitable for tamping into bobbins or being formed into other shapes.

The manganous chloride is compatible with gel producing agents such as the cereal starches or carboxymethylcelluloses. I prefer the commonly used combination of two parts corn starch and one part flour which is made into a paste with the electrolyte and when heated to about 90° C., gelatinizes into a clear stiff gel. The electrolyte can also be immobilized by the use of cellulose retainers, or other suitable means.

In the drawing, which shows a typical dry cell arrangement, the container 1 comprises an aluminum cup which serves as the anode and negative terminal, and having a liner of paper 2. A gel electrolyte layer 6, comprised of an aqueous solution of 40% $MnCl_2.4H_2O$ to which 5% of a flour corn starch mixture has been added, is interposed between the paper liner, which it impregnates, and the depolarizer bobbin 5, which comprises a mixture of 90% $MnO_2$ and 10% acetylene carbon. To this mixture is added sufficient $MnCl_2.4H_2O$ to allow the bobbin to be molded and to provide part of the electrolyte requirements. The bobbin is pressed into shape at a pressure sufficient to insure adequate conductivity and is then forced onto carbon rod 3, on the exposed end of which is a tinned brass cap 7, having a small vent hole, the cap serving as the positive terminal. A fibre washer 4 centrally spaces the carbon rod-bobbin and is located so as to provide a free space above the bobbin for expansion. A layer of hard wax 8 seals the cell from the atmosphere.

As will be seen, the structure described above, is such as to be interchangeable with conventional Le Clanche type dry cells.

The invention lends itself to many other battery structures, both wet and dry, in plastic or metal cases. Increased anode area may be obtained by various methods such as spraying, etching, sintering, etc. As mentioned above, manganous chloride is the most desirable electrolyte; for less efficient operation, manganous bromide can be used, but is relatively undesirable due to its lower voltage. From a number of standpoints, manganese dioxide is outstandingly superior as a depolarizer in the present cell.

As used herein, the term "aluminum" is meant to include aluminum and alloys of aluminum which do not deleteriously react with the manganous chloride.

I claim:

1. An electric current producing cell comprising an anode of aluminum, an electrolyte of manganous chloride, and a depolarizer.

2. A primary cell comprising an anode of aluminum, an oxygen producing cathode depolarizer, and an electrolyte comprising an aqueous manganous halide solution from the group consisting of manganous chloride and manganous bromide.

3. A primary cell comprising an anode of aluminum, a depolarizer of manganese dioxide, and an electrolyte of manganous chloride.

4. An electric current producing cell having an aluminum anode, an electrolyte comprising an immobilized aqueous solution of manganous chloride, and a depolarizer comprising electrolytic manganese dioxide.

SAMUEL RUBEN.

References Cited in the file of this patent

UNITED STATES PATENTS

| Number | Name | Date |
|---|---|---|
| 455,968 | MacLaughlin | July 14, 1891 |
| 513,245 | Paget | Jan. 23, 1894 |
| 759,740 | Noble | May 10, 1904 |
| 1,008,860 | Peek | Nov. 14, 1911 |
| 1,269,915 | Ellis | June 18, 1918 |
| 1,562,517 | Porscke | Nov. 24, 1925 |
| 1,978,624 | Colloseus | Oct. 30, 1934 |
| 2,343,194 | Lawson | Feb. 29, 1944 |

FOREIGN PATENTS

| Number | Country | Date |
|---|---|---|
| 2,234 | Great Britain | Oct. 25, 1884 |
| 2,361 | Great Britain | of 1893 |
| 199,309 | Great Britain | June 21, 1923 |
| 413,934 | Germany | May 19, 1925 |
| 301,923 | Great Britain | Dec. 7, 1928 |
| 882,522 | France | June 7, 1943 |